United States Patent
Mulcahy et al.

(10) Patent No.: US 6,535,597 B2
(45) Date of Patent: *Mar. 18, 2003

(54) PRIVATE CIRCUIT PROVISION IN A TELECOMMUNICATIONS NETWORK

(75) Inventors: Christopher J Mulcahy, Ipswich (GB); John C D Tooze, Colchester (GB); Peter Ashcroft, Elford (GB)

(73) Assignee: British Telecommunications Public Limited Company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/043,420

(22) PCT Filed: Aug. 12, 1997

(86) PCT No.: PCT/GB97/02162

§ 371 (c)(1), (2), (4) Date: Mar. 19, 1998

(87) PCT Pub. No.: WO98/08347

PCT Pub. Date: Feb. 26, 1998

(65) Prior Publication Data

US 2002/0057785 A1 May 16, 2002

(30) Foreign Application Priority Data

Aug. 16, 1996 (EP) .............................. 96305989
Mar. 27, 1997 (EP) .............................. 97302189

(51) Int. Cl.$^7$ ................................ H04M 3/42
(52) U.S. Cl. ............................ 379/207.13; 379/201.01
(58) Field of Search ................. 379/265.01–265.14, 379/266.01–266.1, 309, 230, 209.01, 201.01–201.12, 207.01–207.16, 202.01–206.01, 229

(56) References Cited

U.S. PATENT DOCUMENTS

| | | | |
|---|---|---|---|
| 4,348,554 A | 9/1982 | Asmuth | 379/113 |
| 4,982,421 A | 1/1991 | Kirsch et al. | 379/216 |

(List continued on next page.)

FOREIGN PATENT DOCUMENTS

| | | | | |
|---|---|---|---|---|
| EP | 0400879 A2 | 12/1990 | | |
| EP | 0845913 A2 | * 10/1997 | | H04Q/3/62 |

(List continued on next page.)

OTHER PUBLICATIONS

Weihmayer et al, "Modeling Cooperative Agents for Customer Network Control Using Planning and Agent–Oriented Programming", Globecom 92, Dec. 6–9, 1992, vol. 1, pp. 537–543.

(List continued on next page.)

Primary Examiner—Benny Q. Tieu
(74) Attorney, Agent, or Firm—Nixon & Vanderhye PC

(57) ABSTRACT

A telecommunications network includes local switches, main switches and local access lines. A switching unit which takes the form of a computer with switching capability is connected to the local switch on a channel ISDN link. In order to provide a private circuit between two local access lines, each of these local access lines is connected at the customer's end to an automatic answering device which is connected to a telephone instrument. The following operations are then performed by a user who may be a customer or a network operator. The user calls the switching unit from a telephone instrument connected to any one of the local access lines. The user then enters a user identifier and, using the keypad on the telephone instrument, instructs the switching unit to form a private circuit between the two local access lines. The switching unit then calls each of the two local access lines. At the customer end of each of the local access lines, the call is automatically answered using the automatic answering device. The switching unit then forms a private circuit by connecting the two local access lines together within itself.

7 Claims, 4 Drawing Sheets

U.S. PATENT DOCUMENTS

| | | | |
|---|---|---|---|
| 5,065,392 A | 11/1991 | Sibbitt et al. | 370/360 |
| 5,185,782 A * | 2/1993 | Srinivasan | 379/266 |
| 5,311,574 A * | 5/1994 | Livanos | 379/209 |
| 5,353,339 A | 10/1994 | Scobee | 379/207 |
| 5,396,548 A | 3/1995 | Bayerl et al. | 379/140 |
| 5,483,588 A | 1/1996 | Eaton et al. | 379/202 |
| 5,546,449 A | 8/1996 | Hogan et al. | 379/202 |
| 5,619,561 A | 4/1997 | Reese | 379/142 |
| 5,654,961 A | 8/1997 | Araujo et al. | 370/263 |
| 6,160,879 A * | 12/2000 | Ashcroft et al. | 379/202.01 |

FOREIGN PATENT DOCUMENTS

| | | |
|---|---|---|
| WO | WO 92/00642 | 1/1992 |
| WO | WO 98/08346 | 2/1998 |
| WO | WO 98/08347 | 2/1998 |

OTHER PUBLICATIONS

Bauer et al, Opening the Public Network to Customer Access and Control, IEEE International Conference on Communications Bostonicc/89, Jun. 11–14, 1989, pp. 920–926.

Berman et al, "Customer Network Management and Control Services", ISSLS 86, Sep. 29–Oct. 3, 1986, Tokyo, Japan, pp. 94–98.

Atoui, "An Integrated Systems Design of The Intelligent Network", IEEE/ACM International Conference on Developing and Managing Expert System Programs, Sep. 30–Oct. 2, 1991, pp. 187–194.

Brosemer et al, "Virtual Networks: Past, Present and Future", IEEE Communications Magazine, Mar. 30. 1992, No. 3, New York, US, pp. 80–85.

Davis et al, "Evolution in Business Networking", TELESIS 1988 Three, 15 (1988) No. 3, Ottawa, Canada.

* cited by examiner

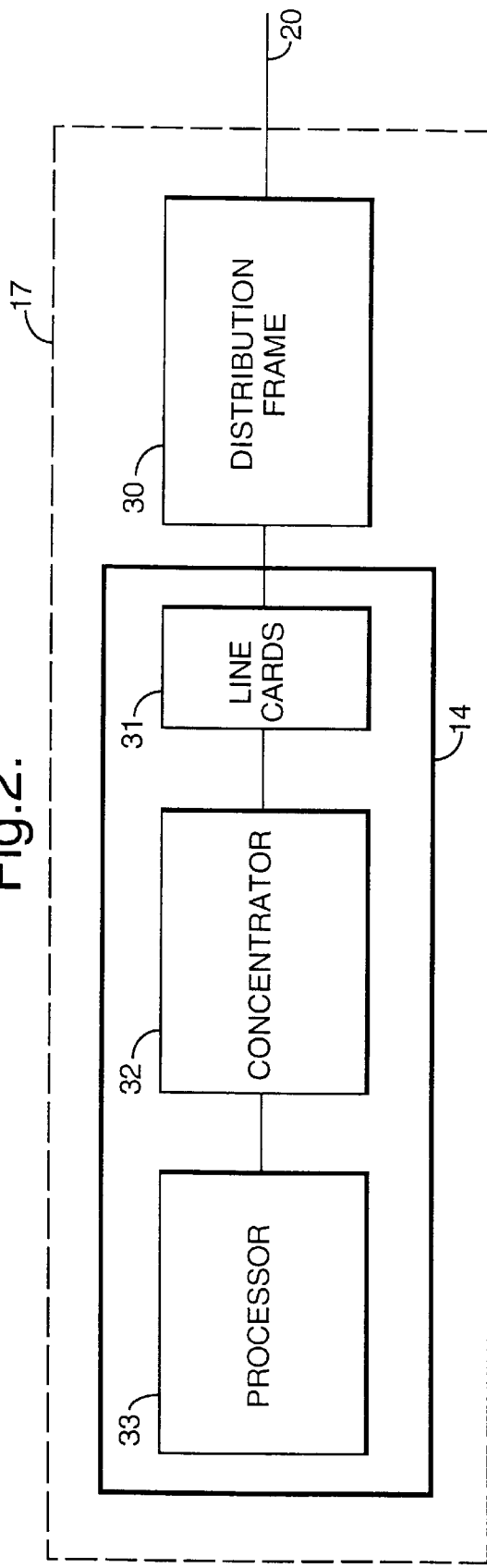
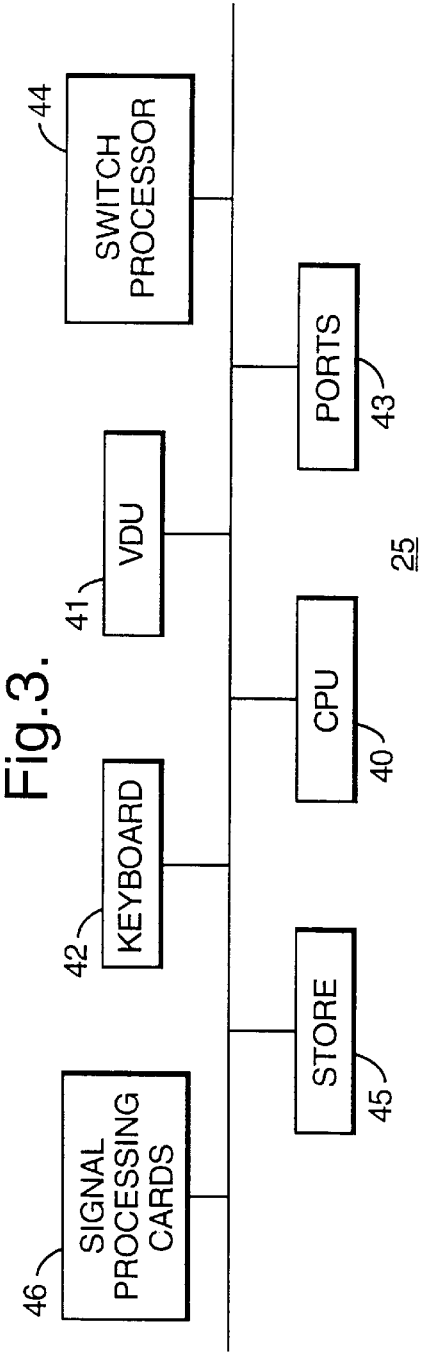

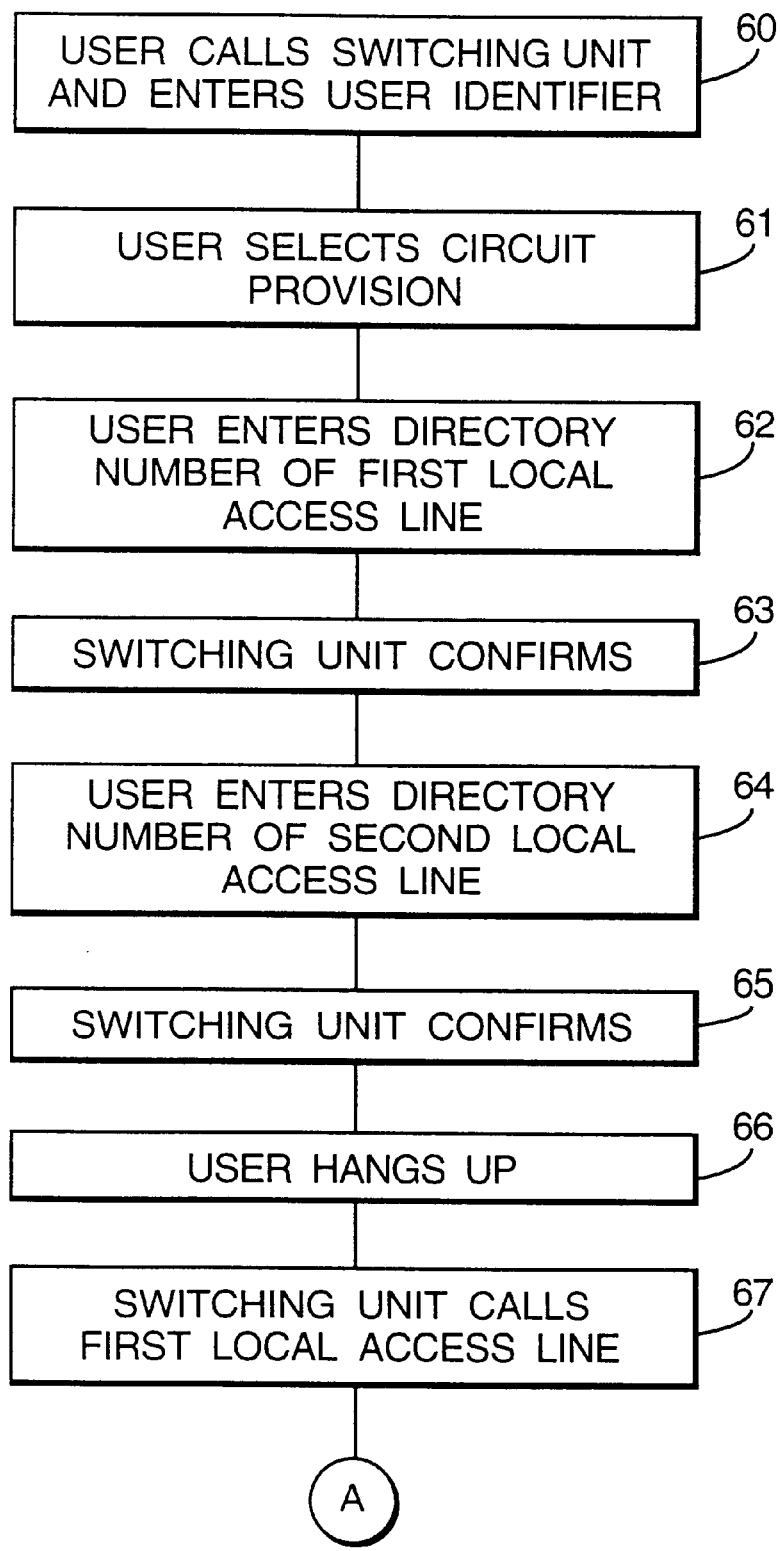

PRIVATE CIRCUIT PROVISION IN A TELECOMMUNICATIONS NETWORK

RELATED APPLICATION

This application is related to U.S. application Ser. No. 09/029,931 filed Mar. 10, 1998.

BACKGROUND OF THE INVENTION

1. Field of the Invention

This invention relates to a method of providing a private circuit in a telecommunications network which has at least two local switches, each local switch having a group of local access lines. The invention is also concerned with such a network which is arranged to provide a private circuit.

2. Related Art

In the usual method of providing a private circuit, the private circuit is provided by permanent, fixed transmission links between two local access lines. Such private circuits utilise valuable network capacity on a permanent basis and the provision of such circuits is labour intensive. It would be desirable to provide a variation of the usual private circuit service in which a circuit could be both set up for a short duration and then disconnected automatically by either the operator of the network or by a customer of the network.

SUMMARY OF THE INVENTION

A private virtual network is described in U.S. Pat. No. 4348554.

According to one aspect of this invention, there is provided a method of providing a private circuit in a telecommunications network between a first local access line and a second local access line, said network having at least two local switches and a switching unit, each local switch being connected to a group of local access lines, said method comprising the steps of:

instructing the switching unit to form a connection between the first local access line and the second local access line;
  the switching unit calling the first local access line;
  the switching unit calling the second local access line; and
  the switching unit forming a connection between the first and second local access lines within itself so as to form a private circuit between the first and second local access lines.

This method provides the advantage that the user of the network can set up a private circuit automatically without creating permanent, fixed transmission links.

According to another aspect of this invention there is provided a telecommunications network having at least two local switches and a switching unit, each local switch being connected to a group of local access lines, said switching unit comprising:

means for receiving a call from a user in which the user instructs the switching unit to form a private circuit between a first local access line and a second local access line;
  means for calling a first local access line;
  means for calling a second local access line; and
  means for forming a connection between a first local access line and a second local access lines within itself so as to form a private circuit between the first and second local access lines.

BRIEF DESCRIPTION OF THE DRAWINGS

This invention will now be described in more detail, by way of example, with reference to the drawings in which:

FIG. 2 is a block diagram of a local switch and an associated distribution frame located at an exchange building and forming part of the network of FIG. 1;

FIG. 3 is a block diagram of a switching unit forming part of the network of FIG. 1;

DETAILED DESCRIPTION OF EXEMPLARY EMBODIMENTS

Figure 1:
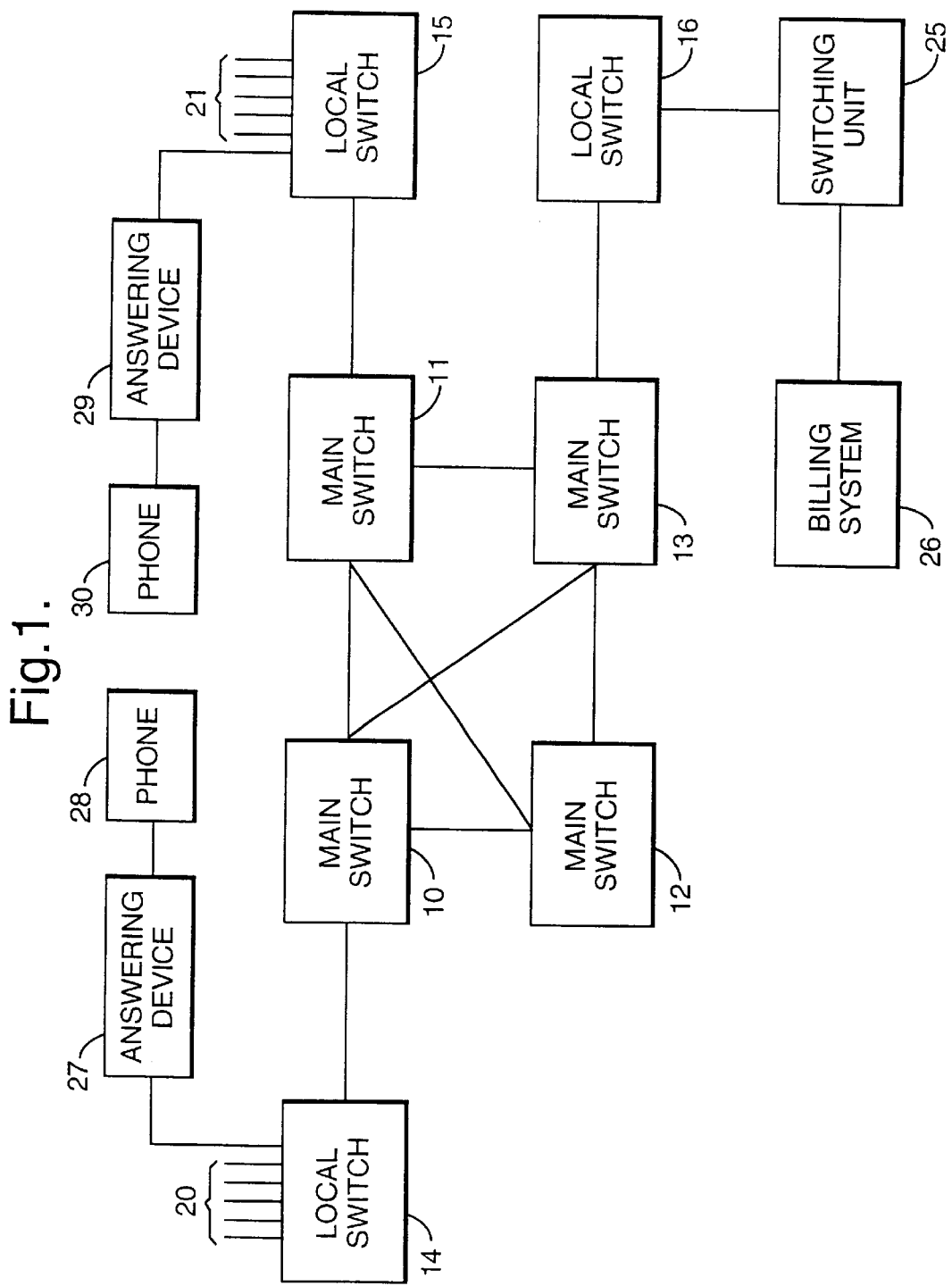
FIG. 1 is a block diagram of a telecommunications network embodying this invention.

Referring now to FIG. 1, there are shown some of the components of a public telecommunications network. As shown in FIG. 1, these components include four fully-interconnected main switches 10, 11, 12, 13 and three local switches 14, 15, 16. Each switch is located at a respective exchange building. The local switches 14, 15 and 16 are connected, respectively, to main switches 10, 11 and 13. For reasons of simplicity, FIG. 1 shows only four main switches and three local switches. However, in a typical public telecommunications network there would be a much larger number of both main switches and local switches. For example, BT's UK public telecommunications network has more than 60 main switches.

Each of the local switches is associated with a group of local access lines, typically several thousand access lines. Each local access line is formed from a pair of copper wires and the end of each access line which is remote from the associated local switch is connected to terminal equipment belonging to a customer of the network. Some of the local access lines 20, 21 associated with local switches 14, 15 are illustrated in FIG. 1. For a purpose which will be described below, for some of the local access lines the terminal equipment comprises an automatic answering device connected to a telephone instrument. By way of example, one of the lines 20 is shown connected to an automatic answering device 27 which is connected to a telephone instrument 28. Likewise, one of the lines 21 is connected to an automatic answering device 29 which is connected to a telephone instrument 30.

The public telecommunications network shown in FIG. 1 is capable of providing both switched connections and private circuit connections between local access lines. The switched connections are formed, in a well known manner, by using the switching capabilities of the local and main switches. A private circuit between two access lines at different local switches is normally created by making physical connections at exchange buildings lying on a path which connects the two local access lines. As will be described in more detail below, the network shown in FIG. 1 also provides an alternative and faster method of providing a private circuit between two local access lines. In this method, the private circuit is formed without making physical connections at exchange buildings between the two switches associated with the local access lines.

This alternative method is particularly useful where a private circuit is required at very short notice and for a relatively short period.

The network of FIG. 1 also includes a switching unit 25. The switching unit 25, as will be described in detail below, is used in the alternative method of providing a private circuit. The switching unit 25 can send charging information to a billing system 26.

Each of the switches 10 to 13 and 14 to 16 shown in FIG. 1 is a System X switch manufactured by GEC Plessey Telecommunications Ltd. The main components of a local switch 14 are illustrated in FIG. 2 and these components will now be described.

Referring now to FIG. 2, the local switch 14 is located at an exchange building indicated by a dashed line 17. At the exchange building 17, each of the access lines 20 is connected to a respective terminal on the input side of a distribution frame 30. The switch 14 includes a bank of line cards 31. The input terminal of each line card is connected to a respective terminal on the output side of the distribution frame 30. The output terminals of the line card 31 are connected to input terminals of a concentrator 32 and the output of concentrator 32 is connected to a processor 33.

In order to connect a local access line to the switched network, the terminal to which it is connected on the input side of the distribution frame is connected to a terminal on the output side of the distribution frame.

In the present example, the switching unit 25 is implemented as a computer provided with switching capability.

Referring now to FIG. 3, the components of switching unit 25 comprise a central processing unit (CPU) 40, a video display unit (VDU) 41, a keyboard 42, input/output ports 43, a switch processor 44 which provides the switching capability, a store 45 and signal processing cards 46. The signal processing cards include a speech synthesiser card, a dual tone multi-frequency detector card and a dual tone multi-frequency generator card. The input/output ports 43 connect the switching unit 25 to the local switch 16 via a 30 channel integrated services digital network (ISDN) communications link and also to billing system 26.

The store 45 is formed from hard disk memory, read only memory (ROM) and random access memory (RAM). The store 45 contains the program for controlling the switching unit 25.

A switching unit of the type shown in FIG. 3 is available from Aculab plc of Lakeside, Bramley Road, Mount Farm, Milton Keynes under the name Millennium CT.

As will be described in more detail below, in order to provide a private circuit between two local access lines, for example one of the access lines 20 and one of the access lines 21, at the customer end each of the access lines is connected to an automatic answering device, such as the automatic answering device 27, which is connected in turn to a telephone instrument. The series of operations which are used to provide a private circuit will now be described with reference to FIG. 4.

Figure 4B:
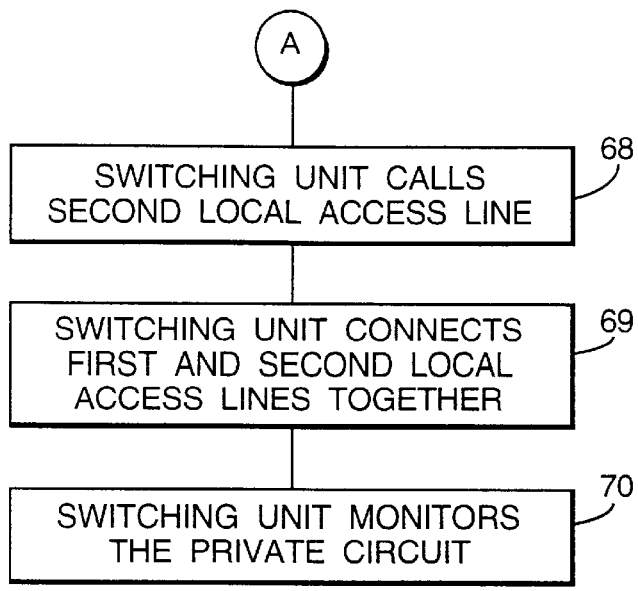
FIG. 4 is a flow chart of the steps which are used to provide a private circuit in the network of FIG. 1 using the switching unit.

Referring now to FIG. 4, in a step 60, a user calls the switching unit 25 from a telephone instrument connected to any one of the local access lines. The user may be a customer or a network operator. In the network shown in FIG. 1, the calling line identity (CLI) of a local access line is transmitted at the beginning of each call to the called line. In step 60, the switching unit 25 captures the CLI for the access line used by the user and stores it for audit purposes. Still in step 60, after calling the switching unit 25, the user enters a user identifier. Where the user is a customer, the user identifier may be a personal identification number (PIN) allocated to the customer for the purpose of setting up a private connection. Where the user is a network operator, the user identifier may be the combination of a PIN and an account number for the private circuit to be created.

After step 60, the switching unit 25 transmits a speech message to the user in which the user is invited to select either circuit provision or circuit de-activation by pressing an appropriate key on the telephone instrument. As the user wishes to create a private circuit, in a step 61, the user selects circuit provision by pressing the key for circuit provision.

After step 61, the switching unit 25 transmits a speech message to the user to invite the user to enter a directory number for the first local access line. Then, in a step 62, using the keys on his telephone instrument, the user enters the directory number for the first local access line.

In a step 63, the switching unit 25 transmits a speech message to the user confirming the directory number which has been entered for the first local access line. The user is invited to key the number in again if there is an error.

After step 63, the switching unit transmits a speech message to the user to invite the user to enter the directory number for the second local access line. Then, in a step 64, using the keys on his telephone instrument, the user enters the directory number for the second local access line.

Next, in a step 65, which is similar to the step 63, the switching unit confirms the directory number of the second local access line. The user then hangs up in a step 66.

Next, in a step 67, the switching unit calls the first local access line and the call is answered by the automatic answering device attached to the customer end of the first local access line.

In a step 68, the switching unit calls the second local access line and the call is answered by the automatic answering device attached to this line.

In a step 69, the switching unit connects the first and second local access lines together within itself, thereby providing a private circuit between the first and second local access lines.

Lastly, in a step 70, the switching unit 25 monitors the private circuit for a possible disconnection. If a disconnection is detected, the switching unit 25 calls the first and second local access lines again and then connects them together within itself so as to reconnect the private circuit.

Figure 5:
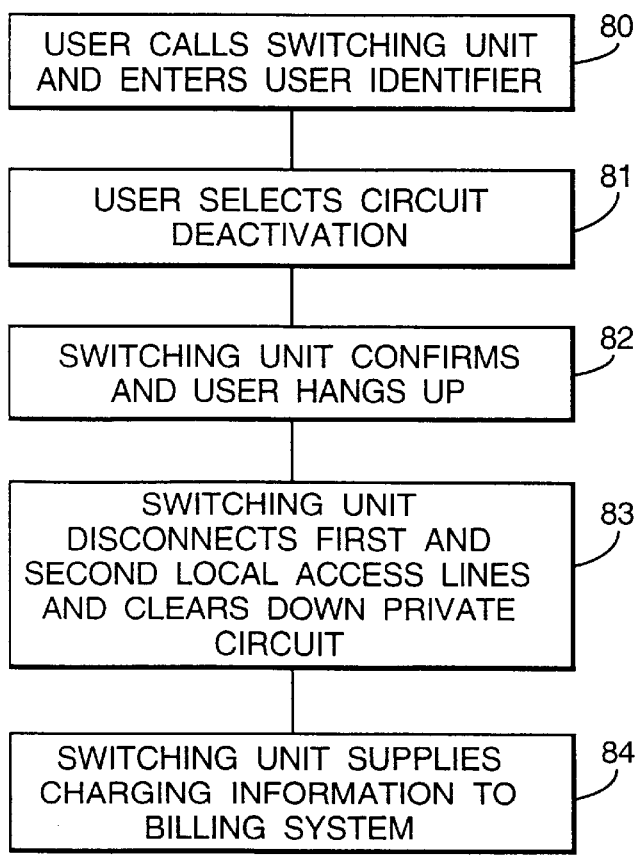
FIG. 5 is a flow chart of the steps which are used in the network of FIG. 1 to disconnect a private circuit which has been formed using the switching unit.

The operations which are performed to disconnect the private circuit will now be described with reference to FIG. 5.

Initially, in a step 80, the user calls the switching unit 25 from a telephone instrument connected to any one of the local access lines. The switching unit 25 captures the CLI of the local access line which is used for audit purposes. As before, the user may be a customer or an operator of the network. After calling the switching unit 25, and still in step 80, the user enters a user identifier. Where the user is a customer, the user as before enters his PIN which has been allocated to him for instructing the switching unit 25 to provide a private circuit. Where the user is a network operator, he enters his PIN and the account number associated with the private circuit which is to be disconnected.

Next, in a step 81, the switching unit invites the customer to select a circuit provision or circuit de-activation by pressing an appropriate key on the telephone instrument. As the user wishes to disconnect the private circuit, he selects circuit de-activation.

Next, in a step 82, the switching unit confirms that the private circuit is to be disconnected and the user then hangs up.

Next, in a step 83, the switching unit disconnects the first and second local access lines within itself and then clears down the private circuit.

Lastly, in a step 84, the switching unit transmits charging information to the billing system 26.

As mentioned above, the switching unit 25 is connected to the local switch 16 by a 30 channel ISDN link. Consequently, the switching unit 25 may be used to provide fifteen 64 kilobit/s private circuits. The private circuits may be analogue or digital. If it is desired to use it to provide a greater number of 64 kilobit/s private circuits, this may be achieved by providing additional 30 channel links between local switch 16 and switching unit 25.

The present invention enables a customer, or a network operator on the instructions of a customer, to create a private circuit from any access line connected to the network. Such a private circuit can be created and disconnected automatically in the sense that it does not require new physical connections to be made at any of the switches. The invention would suit, for example, a customer who wished to transfer one end of a private circuit from their office to their home address in the evenings. It would also suit a customer who was moving premises and wished to transfer one end of a private circuit between old and new addresses as the move progressed. The invention is also suitable for a customer who has a requirement for rapid provision of a private circuit for a short period.

What is claimed is:

1. A method of providing and disconnecting a private circuit in a telecommunications network between no more than a first local access line and a second local access line, said network having at least two local switches and a switching unit, each local switch being connected to a group of local access lines, said method comprising:

a user calling the switching unit and entering a user identifier;

the user selecting any one of circuit provision and circuit disconnection;

if the user selects circuit provision, then the user enters an identifier for the first local access line, the user enters an identifier for the second local access line, the switching unit calls the first local access line, the switching unit calls the second local access line, and the switching unit forms a connection between the first and second local access lines within itself so as to form a private circuit between only the first and second local access lines wherein the private circuit remains connected independently of the use thereof; and if the user selects circuit disconnection, then the switching unit disconnects the first and second local access lines.

2. A method of providing a private circuit as in claim 1, further comprising the steps of:

the switching unit monitoring the private circuit for a disconnection between the first and second local access lines; and in the event of detecting a disconnection between the first and second local access lines, the switching unit calling the first and second local access lines and forming a connection between the first and second local access lines within itself so as to reconnect the private circuit.

3. A method of disconnecting a private circuit which has been provided by the method of claim 1, said method comprising the steps of:

a user calling the switching unit and entering a user identifier;

the user selecting circuit disconnection out of a choice of circuit provision and circuit disconnection; and the switching unit breaking the connection within itself between the first and second local access lines.

4. A method of setting up and disconnecting a private circuit in a public switched telecommunications network (PSTN) between only first and second local access lines connected to respective local switches of the network, said method comprising:

providing a private line switching unit connected to the PSTN via multi-channel signal lines;

in response to a user request received at the switching unit via the PSTN for setting up the private circuit, initiating PSTN calls from the switching unit to each of said first and second local access lines;

automatically answering incoming calls at said first and second local access lines thus connecting such automatically answered incoming calls to respective customer premises equipment thereat;

interconnecting the thus called first and second local access lines within said switching unit to establish the private circuit only between said first and second access lines wherein the private circuit remains connected independently of the use thereof; and in response to a user request received at the switching unit via the PSTN for disconnecting the private circuit, the switching unit disconnecting said first and second access lines.

5. A method as in claim 4 further comprising:

monitoring the thus established private circuit for undesired disconnections and automatically re-establishing said private circuit if such disconnection is detected.

6. Apparatus for setting up and disconnecting a private circuit in a public switched telecommunications network (PSTN) between only first and second local access lines connected to respective local switches of the network, said apparatus comprising:

a private line switching unit connected to the PSTN via multi-channel signal lines for connecting and disconnecting said first and second local access lines;

means for responding to a user request received at the switching unit via the PSTN to connect said first and second local access lines by initiating PSTN calls from the switching unit to each of said first and second local access lines;

means for automatically answering incoming calls at said first and second local access lines thus connecting such automatically answered incoming calls to respective customer premises equipment thereat;

means for interconnecting the thus called first and second local access lines within said switching unit to establish a private circuit only between said first and second local access lines wherein the private circuit remains connected independently of the use thereof; and means for responding to a user request received at the switching unit via the PSTN to disconnect said first and second local access lines by disconnecting said first and second local access lines.

7. Apparatus as in claim 6 further comprising:

means for monitoring the thus established private circuit for undesired disconnections and automatically re-establishing said private circuit if such disconnection is detected.

* * * * *